Feb. 7, 1939. T. C. PEW 2,146,440
BEARING RETAINER AND METHOD OF MAKING SAME
Filed April 7, 1937
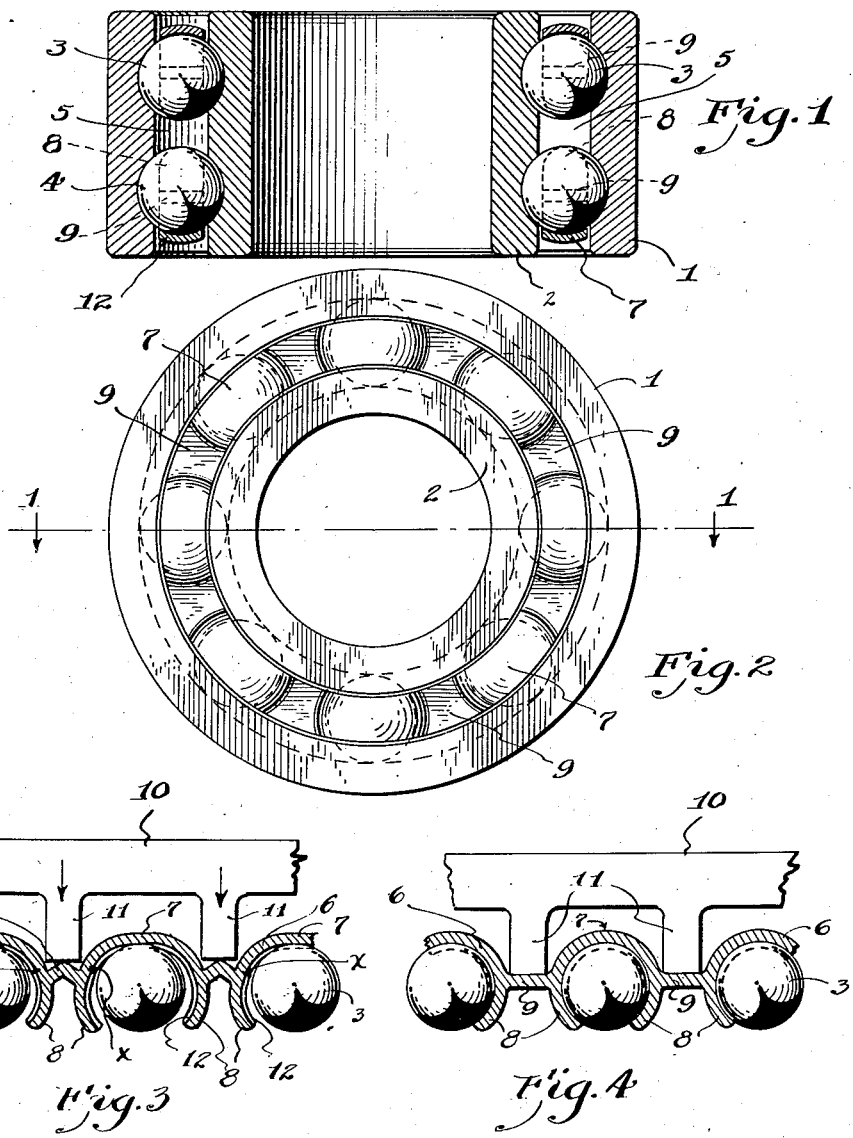
INVENTOR.
Thomas C. Pew
BY
Barnes, Kisselle, Laughlin & Raisch
ATTORNEYS Patented Feb. 7, 1939

2,146,440

UNITED STATES PATENT OFFICE 2,146,440

BEARING RETAINER AND METHOD OF MAKING SAME

Thomas C. Pew, Ann Arbor, Mich., assignor to Hoover Ball & Bearing Company, Ann Arbor, Mich., a corporation of Michigan Application April 7, 1937, Serial No. 135,406

4 Claims. (Cl. 29—148.4)

This invention relates to antifriction bearings, and it has to do particularly with a retainer for antifriction elements running between races and a method of making and assembling the retainer and bearing.

The invention is concerned particularly with retainers especially useful in bearings with two rows of antifriction elements, wherein inner and outer races are each of one piece construction. In double row bearings of this type the space between the rows is not accessible and this fact requires some special provision or structure in order to place a retainer around the antifriction elements, where the retainer is other than the type which snaps over the elements. Among the proposed structures in the prior art for meeting this problem are: the provision of one or more apertures in the outer race for the insertion of a tool in the space between the rows of antifriction elements for bending portions of the retainer around the antifriction elements; the provision of a retainer structure having portions designed to be straightened out, after the retainer is in position, to force pocket-forming portions around the antifriction elements. The first proposal above mentioned is unsatisfactory as a special race structure is needed and considerable time and bother is required in making the assembly. In the second proposal above mentioned the parts designed to be straightened out joined the end portions of adjacent cavities for the antifriction elements. With such a structure the free end portions of the retainer cavities are to be bent or fashioned around the antifriction elements, and an accurate precision retainer cannot be obtained. Where the antifriction element is a ball the free end of each cavity had to be bent arcuately around the ball and the proper curves and fit could not be maintained.

The present invention has been worked out in connection with ball bearings, although the invention may not be necessarily limited to ball bearings. In accordance with the invention a retainer may be in the form of an integral piece such as a die casting formed with cavities therein for the balls. The cavities are provided by projecting arms spaced far enough apart to let the balls in. The arms, however, are initially given a radius corresponding to the ball. Parts are provided between adjacent ball cavities which are designed to be straightened out in order to force the arms toward the respective balls so that the arms will extend around more than one-half of the circumference of the balls to assemble the retainer therewith. Inasmuch as the arms initially have the proper radius they are merely brought up against the balls and the radius is not substantially altered as is the case with the prior art.

One concrete example of a retainer for carrying out the invention is illustrated in the accompanying drawing.

Fig. 1 is a cross sectional view illustrating more or less conventionally a double row ball bearing.

Fig. 2 is a side elevational view thereof.

Fig. 3 is a developed view illustrating a portion of the retainer in its initial form with the balls in place.

Fig. 4 is a developed view illustrating the retainer fashioned around the balls.

The double row ball bearing as illustrated in Fig. 1 has a single-piece outer race 1 and a single-piece inner race 2 with one row of balls 3 and a second row of balls 4. Where the races are of single piece construction the space 5 between the balls is relatively inaccessible. Where single-piece races are used the balls must be spaced apart because the races are disposed eccentrically of each other for insertion of the balls, and, of course, the races cannot be entirely filled. After the proper number of balls are located the races may be centered relative to each other by the proper spacing between the balls. To maintain the balls thus properly spaced, a retainer is necessary.

The retainer of the invention may be applied to the balls by operations entirely on the outside so that it is not necessary to utilize the space 5 and the retainer is more securely fastened to the balls than one which is merely snapped over them. The initial form of a retainer is illustrated in Fig. 3 and the retainer may be and preferably is an integral piece such as a die casting. It has a series of pockets as illustrated generally at 6. These pockets, as initially formed, have a bight portion 7 of somewhat elongated form, on an arc greater than that of the ball. From about the point X to the end of the arms 8 the initial radius substantially corresponds to the ball. The arrangement is such that the distance between the ends of the arms 8 for each cavity is such as to permit a ball to pass therethrough into the cavity as illustrated in Fig. 3. This retainer made up of a plurality of cavities has connecting pieces 9 between the cavities, as illustrated. These connecting pieces initially are of a greater over all length than the distance between the point of connection to adjacent cavities, and therefore the connecting pieces 9 are not straight. To the contrary, they have a bent formation. The term "bent" is used in a broad sense to cover something other than a straight line, and is not intended to mean that the metal is bent after it is formed, for the pieces 9 are in fact initially cast in the bent form in the structure specifically illustrated herein.

After the balls are located between the races, the assembly may be placed on a support, as for example, in a suitable jig or die. The retainer may then be passed over the balls, with a ball located in each cavity, and then pressure may be applied to the connections 9 to straighten them out. For this purpose there may be a single circular tool as illustrated at 10 having a plurality of finger portions 11 each for contact with connecting member 9. As a tool is moved with pressure toward the retainer the pieces 9 are straightened out. The reactance to the pressure is furnished by the balls with the portions 7 of the cavities contacting with the balls. As the connectors are straightened out, as illustrated in Fig. 4, the arms 8 are brought up against the ball preferably in seating relation. At the same time the back of each cavity is formed on a shorter radius and formed directly around the ball. However, the curvature of the arms 8 from about the point X to the ends thereof remains substantially the same, these portions of the arms merely being brought up against the balls. In stating that the pieces 9 are straightened, it is not meant that they are straightened out into a straight piece, but this term is used broadly to cover a straightening action even though the straightening action fall short of complete straightening.

In the arrangement as illustrated, it so happens that the over all diameter of the retainer may be slightly decreased because the shortening of the cavities by shortening of the radii of the bights represents a loss of more than what is gained by the straightening out of the connectors 9. However, the invention is not limited to this, as this point may be varied.

Heretofore, it has been proposed to have an arrangement where a part to be straightened joined the ends of the arms such as the arms 8 (except that the arms where not curved on the radius of the ball), and in the action, an attempt was made to put a curvature in the arms by fashioning the same around the balls. Satisfactory dimensions cannot be obtained in this way. In the present invention the curvature of the arms is pre-established and the arms merely brought up against the balls. As illustrated in Fig. 4, it will be seen that the retainer cavities overlap the balls a considerable distance and therefore the retainer is held securely in place and is not liable to become dislodged or fall out of position as might be the case with the retainer which is merely snapped over the balls. At the same time no special race construction is necessary to permit access into the space 5.

Obviously, after one retainer is applied to one row of the ball bearings the other retainer may be applied and it is within the invention to apply the retainers simultaneously. The retainers thus constructed are preferably made of brass, bronze or other material having little spring tendency, so that as the retainer is fashioned around the balls there is very little spring in the metal to cause the cavity to spring back away from the balls. The metal used may be termed as being substantially dead soft. However, the little spring-back tendency in the metal mentioned may be just enough to provide the desired clearance for rotation of the balls within their cavities.

The portions forming the cavities have a substantial width measured radially of the bearing as illustrated in Figs. 1 and 2, and thus may have small clearances with the inner and outer races. The portions forming the cavities may have their inner faces formed arcuately as illustrated at 12 so as to fit nicely around the balls in a radial direction.

I claim:

1. A ball bearing retainer comprising, a one-piece annular body formed of a plurality of recess members for receiving the balls, each having a bight portion and oppositely disposed arms and connecting pieces connecting said members, said members opening axially of the annular body, said connecting pieces being disposed substantially mid-way between the ends of the arms and the bottom of the bight portions, the bight portion of each member initially having a radius greater than the ball received therein, and the arms having radii substantially the same as the ball with the ends thereof spaced apart for the entrance of the ball therebetween, said connecting pieces being initially bent and adapted to be straightened out to bring the curved arms up against the balls and to shorten the radii of the bight portions to substantially that of the balls.

2. A retainer for a row of balls in a double row bearing comprising, a one-piece annular body formed of a plurality of recess members and pieces connecting the recess members, each recess member having a bight portion and oppositely disposed arms with the arms curved substantially on the radii of the balls to be received therebetween, said body being arranged to be passed over a row of balls with a ball located in each recess, the connecting pieces being disposed substantially midway between the free ends of the arms and the bight portions of the recess members and adapted to be extended by the application of pressure thereto from the side of the bearing from which the retainer was assembled over the balls, said connecting pieces holding the recess members spaced apart with the curved arms and the bight-portions in close proximity to the balls and holding the same therein.

3. The method which comprises, forming a retainer for a row of balls having a plurality of recess members each for receiving a ball and each having a bight portion on a radius greater than the ball and oppositely extending arms curved on radii substantially the same as the ball, forming bent connecting pieces for connecting the recess members with the connecting pieces located substantially mid-way between the ends of the said arms and the bottoms of the bight portions, passing the retainer over the row of balls with the balls moving in between the arms and abutting against the bight portions, then subjecting the bent connecting pieces to pressure to straighten them out, with the balls reacting against the pressure, whereby the radius of each bight portion is reduced by being formed around the ball and the curved arms are urged into close proximity with the balls.

4. The method which comprises, forming a retainer for a row of ball bearings with a plurality of recess members each for receiving a ball and each having a bight portion on a radius greater than that of the ball and each with oppositely extending arms preformed on a radius substantially the same as the ball, forming bent connecting pieces connecting the recess members and located substantially mid-way between the ends of the arms and the bottoms of the bight portions and substantially simultaneously extending the connecting pieces and shortening the radii of the bight portions to fashion the recess members around the balls in assembled relation by bringing the preformed arms into position around the balls.

THOMAS C. PEW.